United States Patent
Surendran (10) Patent No.: US 8,982,711 B2
(45) Date of Patent: Mar. 17, 2015

(54) SELF-HEALING COMMUNICATIONS NETWORK

(75) Inventor: Sachin Surendran, Christchurch (NZ)

(73) Assignee: Allied Telesis Holdings Kabushiki Kaisha (JP)

( * ) Notice: Subject to any disclaimer, the term of this patent is extended or adjusted under 35 U.S.C. 154(b) by 253 days.

(21) Appl. No.: 13/452,022

(22) Filed: Apr. 20, 2012

(65) Prior Publication Data

US 2013/0279366 A1    Oct. 24, 2013

(51) Int. Cl.
| | |
|---|---|
| *G01R 31/08* | (2006.01) |
| *H04L 12/46* | (2006.01) |
| *H04L 12/24* | (2006.01) |
| *H04L 12/26* | (2006.01) |
| *H04L 12/705* | (2013.01) |
| *H04L 12/721* | (2013.01) |

(52) U.S. Cl.
CPC .............. *H04L 12/462* (2013.01); *H04L 41/12* (2013.01); *H04L 43/0811* (2013.01); *H04L 45/18* (2013.01); *H04L 45/38* (2013.01)
USPC .......................................... 370/242; 370/252

(58) Field of Classification Search
CPC ... G06F 17/5009; G06F 8/00; G06F 13/4247; G08C 17/02; G08C 2201/91; G08C 2201/93; H04J 3/0632; H04J 3/0638; H04L 12/2801; H04L 29/06027; H04L 43/16; H04L 45/00; H04L 65/1069; H04L 12/42; H04L 12/04
USPC ......... 370/216, 229, 232, 235, 241, 242, 248, 370/249, 252, 253, 254, 255, 465
See application file for complete search history.

(56) References Cited

U.S. PATENT DOCUMENTS

| | | | |
|---|---|---|---|
| 4,710,915 A | | 12/1987 | Kitahara |
| 4,878,232 A | * | 10/1989 | Fisher ........................... 375/362 |
| 5,321,812 A | * | 6/1994 | Benedict et al. ............... 709/223 |
| 5,923,643 A | | 7/1999 | Higgins et al. |
| 6,298,456 B1 | | 10/2001 | O'Neil et al. |
| 6,859,144 B2 | | 2/2005 | Newman et al. |
| 7,133,358 B2 | | 11/2006 | Kano |
| 7,233,991 B2 | | 6/2007 | Adhikari |
| 7,562,389 B1 | | 7/2009 | Goyal et al. |
| 7,646,769 B2 | | 1/2010 | Arai et al. |
| 7,672,228 B1 | | 3/2010 | Senevirathne et al. |
| 7,729,271 B2 | | 6/2010 | Tsuchiya et al. |
| 7,788,721 B2 | | 8/2010 | Suzuki et al. |

(Continued)

OTHER PUBLICATIONS

B. Claise, Ed., "Cisco Systems NetFlow Services Export Version 9", pp. 1-33, IETF RFC3954, Oct. 2004, http://tools.ietf.org/pdf/rfc3954.pdf (downloaded Dec. 15, 2011).

(Continued)

*Primary Examiner* — Yemane Mesfin
*Assistant Examiner* — Mon Cheri Davenport (57) ABSTRACT

Methods, apparatus, and computer-readable media for detecting and removing unwanted loops in communications networks having host processors, nodes, and segments connecting the nodes are disclosed. In one embodiment, a set of steady state data regarding direction of a network traffic flow is collected and stored. Then, a newly sampled flow is compared with the stored steady state data to detect flows whose paths contradict their steady state direction, and a network loop is identified when a segment carries such contradictory flows.

18 Claims, 5 Drawing Sheets

(56) References Cited

U.S. PATENT DOCUMENTS

| | | |
|---|---|---|
| 7,843,854 B2 | 11/2010 | VanZante |
| 7,869,359 B2 | 1/2011 | Kohler et al. |
| 2003/0174651 A1 | 9/2003 | Morton |
| 2005/0076140 A1 | 4/2005 | Fung |
| 2006/0285499 A1 | 12/2006 | Tzeng |
| 2007/0157306 A1 | 7/2007 | Elrod et al. |
| 2011/0128863 A1 | 6/2011 | Hsieh et al. |

OTHER PUBLICATIONS

"MPLS Loop Detection and Prevention", http://etutorials.org/Networking/MPLS+VPN+Architectures/Part+I+MPLS+Technology+and+Configuration/Chapter+5.+Advanced+MPLS+Topics/MPLS+Loop+Detection+and+Prevention/(Downloaded Dec. 15, 2011).

A. Keromytis, "Tagging Data in The Network Stack: mbuf_tags", 7 pgs., 2003, presented at BSDCon '03, http://www.cs.columbia.edu/~angelos/Papers/mbuf_tags.pdf (downloaded Dec. 15, 2011).

T. R. Gopalakrishnan Nair et al., "A Novel Agent Based Approach for Controlling Network Storms", 7 pgs., http://arxiv.org/ftp/arxiv/papers/1107/1107.1954.pdf (downloaded Dec. 15, 2011).

P. Phaal et al., "InMon Corporation's Flow: A Method for Monitoring Traffic in Switched and Routed Networks", pp. 1-31, Sep. 2001, IETF RFC3176, http://tools.ietf.org/pdf/rfc3176.pdf (downloaded Dec. 15, 2011).

T. Holland, "Understanding IPS and IDS: Using IPS and IDS together for Defense in Depth", 14 pgs., Feb. 23, 2004, http://www.sans.org/reading_room/whitepapers/detection/understanding-ips-ids-ips-ids-defense-in-depth_1381 (downloaded Dec. 15, 2011).

* cited by examiner

SELF-HEALING COMMUNICATIONS NETWORK

BACKGROUND ART

Unwanted network loops are a common problem in large and small communications networks. Such loops can cause network broadcast storms, resulting in deterioration of network bandwidth and performance. Such storms can flood the host processors with duplicate packets, resulting in wasted CPU utilization on said hosts.

SUMMARY

One or more embodiments disclosed herein are methods, apparatus, and computer-readable media for detecting and removing unwanted loops in communications networks having host processors, nodes, and segments connecting the nodes. In one embodiment, a method is disclosed that collects and stores a set of steady state data regarding direction of network traffic flows through the nodes and segments for at least one network flow. A sampled data flow is compared with the stored steady state data flow to detect flow paths that contradict the steady state direction. Accordingly, a network loop and a segment that has a data flow that contradicts the steady state data flow is identified.

BRIEF DESCRIPTION OF THE DRAWINGS

Embodiments are illustrated by way of example, and not by way of limitation, in the figures of the accompanying drawings and in which like reference numerals refer to similar elements.

DETAILED DESCRIPTION

In some embodiments described herein, unwanted network loops are detected and identified. In one embodiment, network loop information can be used to instigate remedial action to remove an unwanted loop. In some embodiments, this procedure can be automated, resulting in a self-healing as well as a self-diagnosing network.

The embodiments disclosed herein are described with respect to a Layer 2 data network for illustration purposes. Describing the embodiments with respect to Layer 2 data network is exemplary and is not intended to limit the scope of the embodiments. For instance, embodiments described herein may be used with L3 digital networks, digital networks other than L2 and L3 networks, and/or analog networks. In digital networks, the data may or may not be packetized. It is appreciated that data flow can be identified by observing the data regardless of whether the data is packetized. Further, distinguishing between network reconfigurations and network loops may reduce false positive determination of network loops.

According to one embodiment, data packets are sampled to collect information about the real-time state of a network. Data packet samples may be obtained using processes or programs, such as sflow, netflow, or other programs that allow data flow sampling in a network. As used herein, "traffic flows" are streams of traffic or moving data that share similar characteristics, such as a source and a destination. When no loop exists in the network, flow information collected from data packet samples is called "steady state information".

Figure 2:
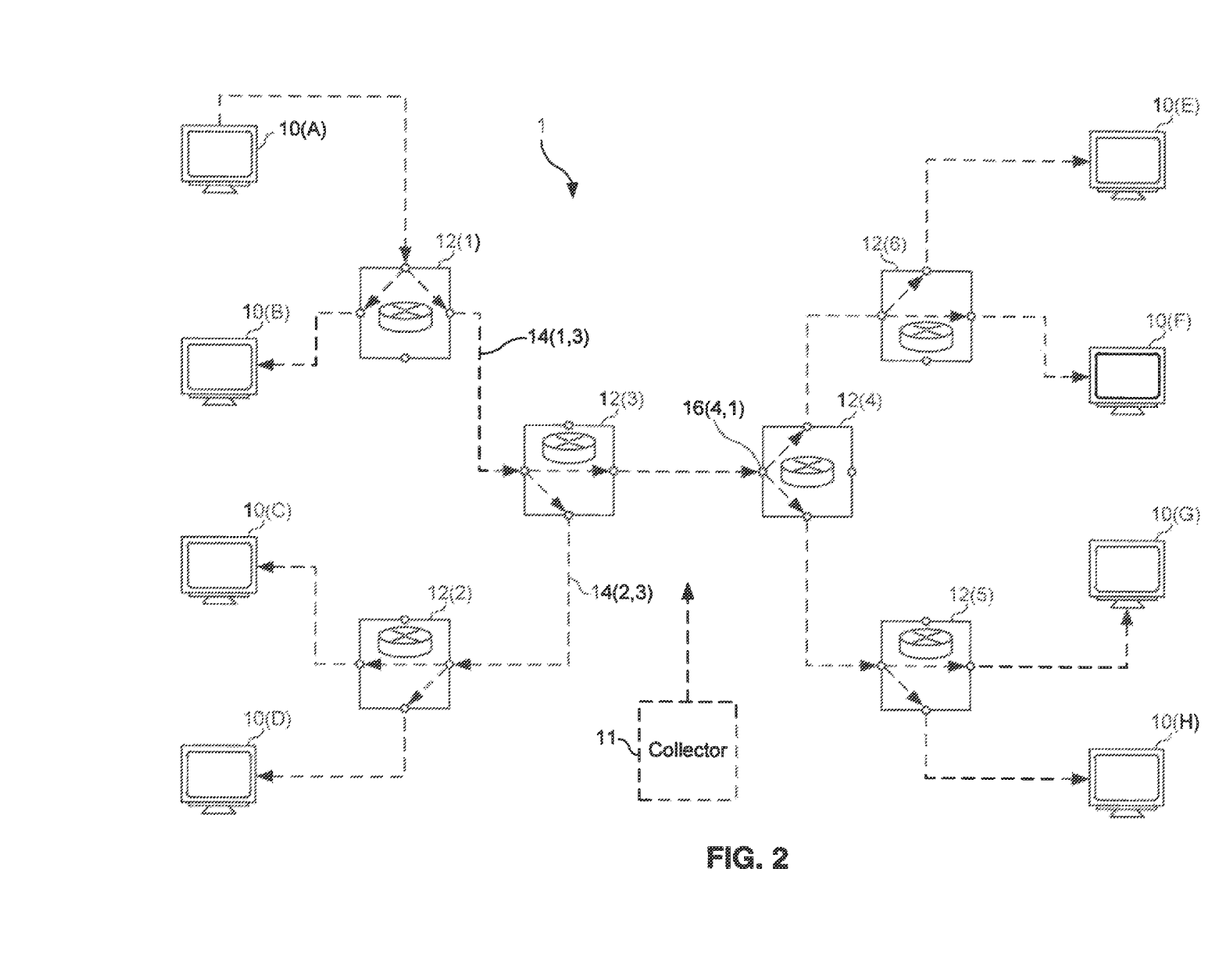
FIG. 2 shows a broadcast flow of a network according to an embodiment.

In steady state, a network can be represented as a tree, with no closed data paths or loops, as illustrated in FIG. 2. In other words, a path can be traced from source to destination for a flow of traffic. This path can be broken into individual segments connected by nodes. According to one embodiment, traffic can flow in one direction along each segment. This direction may be learned and recorded in the steady state.

In one embodiment, information regarding the steady state is collected and stored on a network management computer, or otherwise referred to as a processing entity, which processes the sampled packets. In some embodiments, a host processor can function as the processing entity. In an alternative embodiment, the processing entity can be a separate collector that is connected to a network via a network connection. In yet another embodiment, nodes in a network, such as ports on switches may function as the processing entity.

A network storm can occur when an unwanted closed loop path is created in the network. Packets can travel in a closed loop path indefinitely. This is more fully described below in conjunction with FIGS. 3 and 4. When an unwanted loop arises, the uni-directional nature of traffic flows in many segments is violated. For instance, these segments may carry bidirectional flows for the same overall network flow. In other instances, the flows start taking paths that contradict their steady state direction. Violation of traffic flow direction can be detected by comparing the stored steady state information with the newly sampled packet information. According to one embodiment, the data packet may be sampled in the ingress and/or egress direction of a node (e.g., ports of switches) of network flows of a network.

In some embodiments, one or more loop pointers may be created in response to a determination that a traffic flow direction of a sampled packet of a flow contradicts its steady state direction. In some embodiments, a loop pointer may be a directional pointer, which is local to a segment in a network flow. In some embodiments, a loop pointer may point to a direction of a loop in a network. In other embodiments, a loop pointer may point in a direction that contradicts a direction of transmission of a sampled packet. In other words, in one embodiment, a loop pointer is an identifier that the traffic flow associated with a segment of a network is contradicting its steady state traffic flow.

Over time, unwanted loops in a network may develop. As a result, a set of loop pointers may be created for the unwanted loops. These loop pointers may form a sequential linked list indicating traffic flow through the network. The loop pointers may be generated across the network. In one embodiment, multiple traffic flows in a network may be analyzed in a single instance, and a set of loop pointers may be created for and associated with each traffic flow that is analyzed. It is appreciated that the loop pointers described herein point and lead to an unwanted loop anywhere in the network, irrespective of whether the loop pointer was created and associated with a specific traffic flow within the network. In some embodiments, loop pointers may not be created if a direction of a sampled packet does not contradict its steady state information.

In one embodiment, the loop location information is collected from nodes distributed throughout the network, e.g., routers or ports of switches. The collected information may be stored and processed collectively by a network management entity, e.g., processing entity. According to one embodiment, steady state information may be stored and processed in a distributed fashion. For example, software, firmware, and/or hardware module associated with each node in a network may determine whether there is a bidirectional traffic flow on a segment. If a bidirectional traffic flow is detected, then a loop pointer may be generated on that segment. The module associated with each node can declare the presence of a loop pointer and pass the information in the direction of the loop pointer to a peer node at the other end of a segment. Once each of the nodes within the loop is identified, any of the nodes present in the loop can break the loop and end the packet storm. Accordingly, using predefined rules, a network management host, a collector, a network node can diagnose and terminate a network loop in an autonomous manner. Thus, the embodiments described herein provide a mechanism to allow a network to self-heal as well as self-diagnose.

Figure 1:
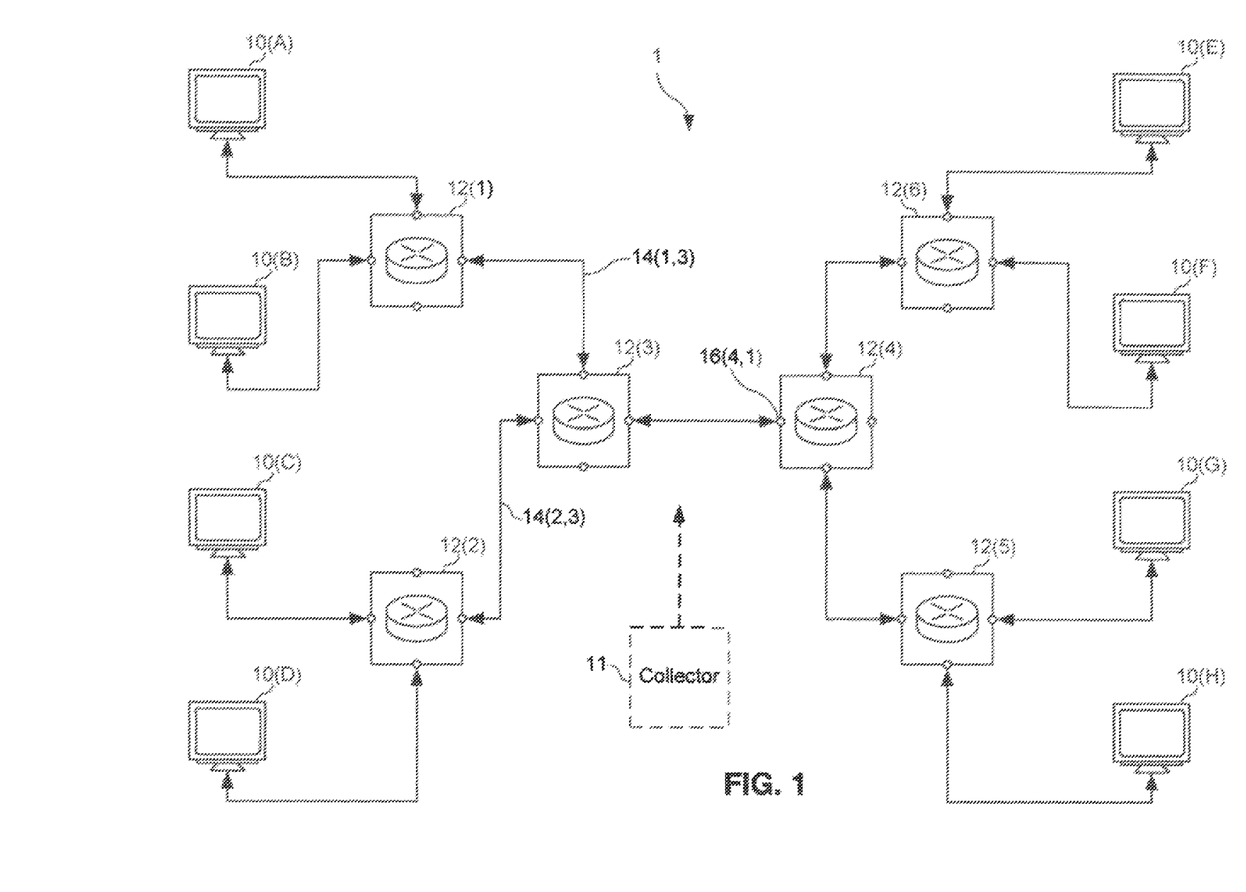
FIG. 1 shows a network topology of a network according to one embodiment.

FIG. 1 shows a network topology of a network according to one embodiment.

FIG. 1 shows an exemplary L2 digital packet switching network 1 that includes six switches 12(1), 12(2), 12(3), 12(4), 12(5) and 12(6) and eight host processors 10(A), 10(B), 10(C), 10(D), 10(E), 10(F), 10(G) and 10(H). It is appreciated that switches, ports or other components within the network may be commonly referred to as nodes. Nodes, such as noted 16(4,1), may be enabled to sample data in an ingress and/or egress direction. In this example, the sampled data may be sent to a collector 11. Collector 11 is shown with a single dashed lead line to avoid cluttering the drawing. However, in some embodiments, collector 11 may be coupled to all nodes, such as node 16(4,1). In some embodiments, the collector 11 may be used to perform methods described herein, and may be referred to as the processing entity.

A link connecting two nodes is referred to as a segment, such as segments 14(1,3) and 14(2,3) illustrated in FIG. 1. In some embodiments, segments may be implemented using copper wires, microwave signals, optical cables, and other types of physical links. FIG. 1 shows segments, such as segments 14(1,3) and 14(2,3), as solid lines to indicate that the paths exist, regardless of whether any actual traffic is flowing on the paths. In other embodiments, segments, like segment 14(1,3), can be a logical connection between two nodes, rather than a physical link. For example, loops may be detected within individual VLANs.

FIG. 2 shows a broadcast flow of a network according to one embodiment. In FIG. 2, dashed lines show a steady state direction of traffic flow for a broadcast frame (single flow) from source host processor 10(A). The broadcast message may be sent to all hosts 10(A), 10(B), 10(C), 10(D), 10(E), 10(F), 10(G) and 10(H) in the network 1. The packets for this flow are sampled at a particular sampling rate by the nodes, such as node 16(4,1). It is appreciated that the sampling rate may be preselected. Furthermore, it is appreciated that the sampled data may be sent to the collector 11 and stored therein. If the collected data contains no loop, then the collected information is the steady state information. The collector 11 records the direction of flow in each segment, such as segments 14(1,3) and 14(2,3), for a particular traffic flow.

Figure 3:
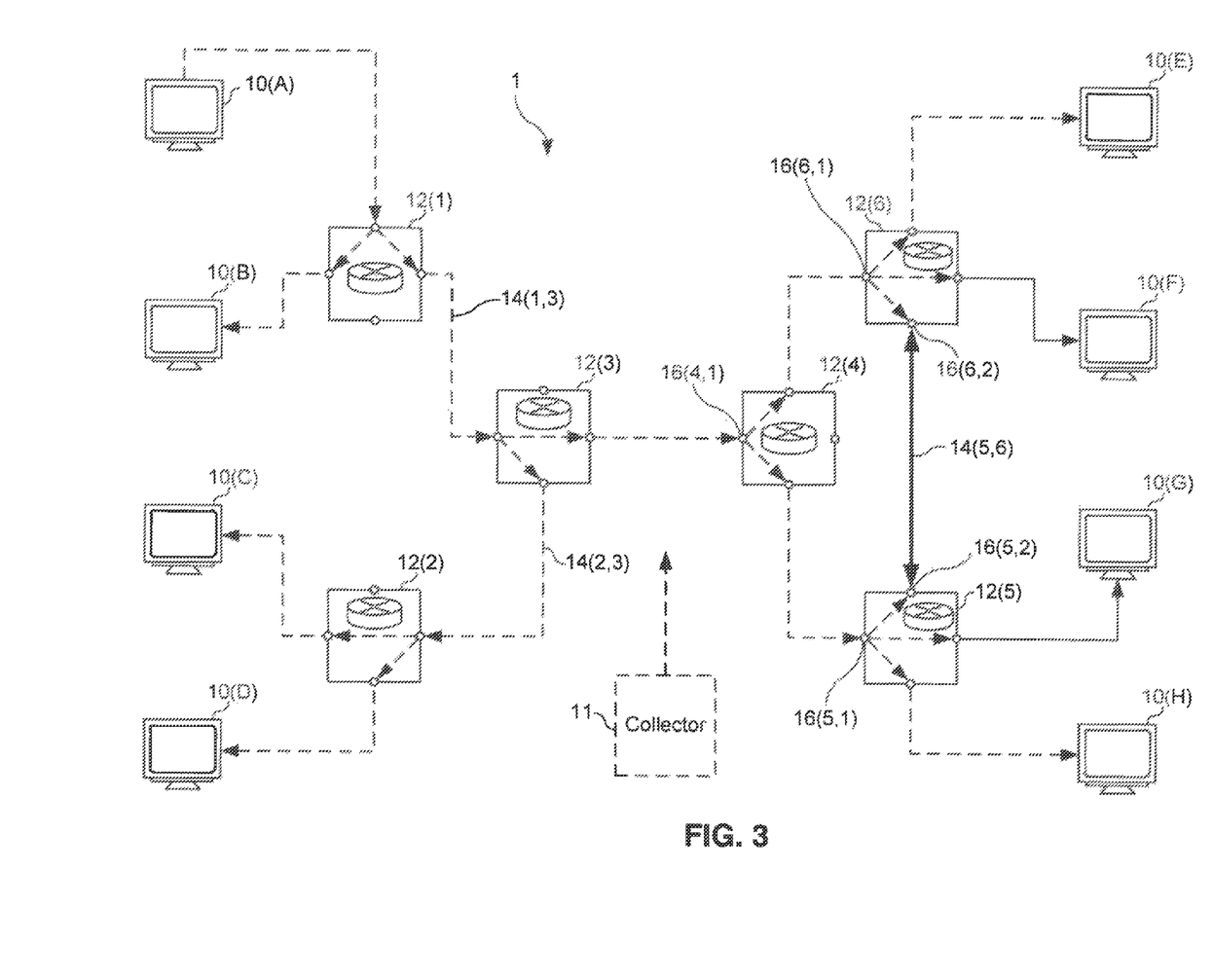
FIG. 3 shows a network loop according to one embodiment.

FIG. 3 shows a network loop according to one embodiment. FIG. 3 shows that a new unwanted connection 14(5,6) has arisen between switches 12(5) and 12(6). This can occur by virtue of a bad design or human error, or a combination of the two. For instance, a software error may occur, creating a new closed loop path. The unwanted loop goes via switches 12(4), 12(5), and 12(6), with the newly formed connection 14(5,6) completing the loop. In FIG. 3, the new dashed lines represent connections formed between ports 16(6,1) and 16(6,2), and between ports 16(5,1) and 16(5,2), which complete the loop.

Figure 4:
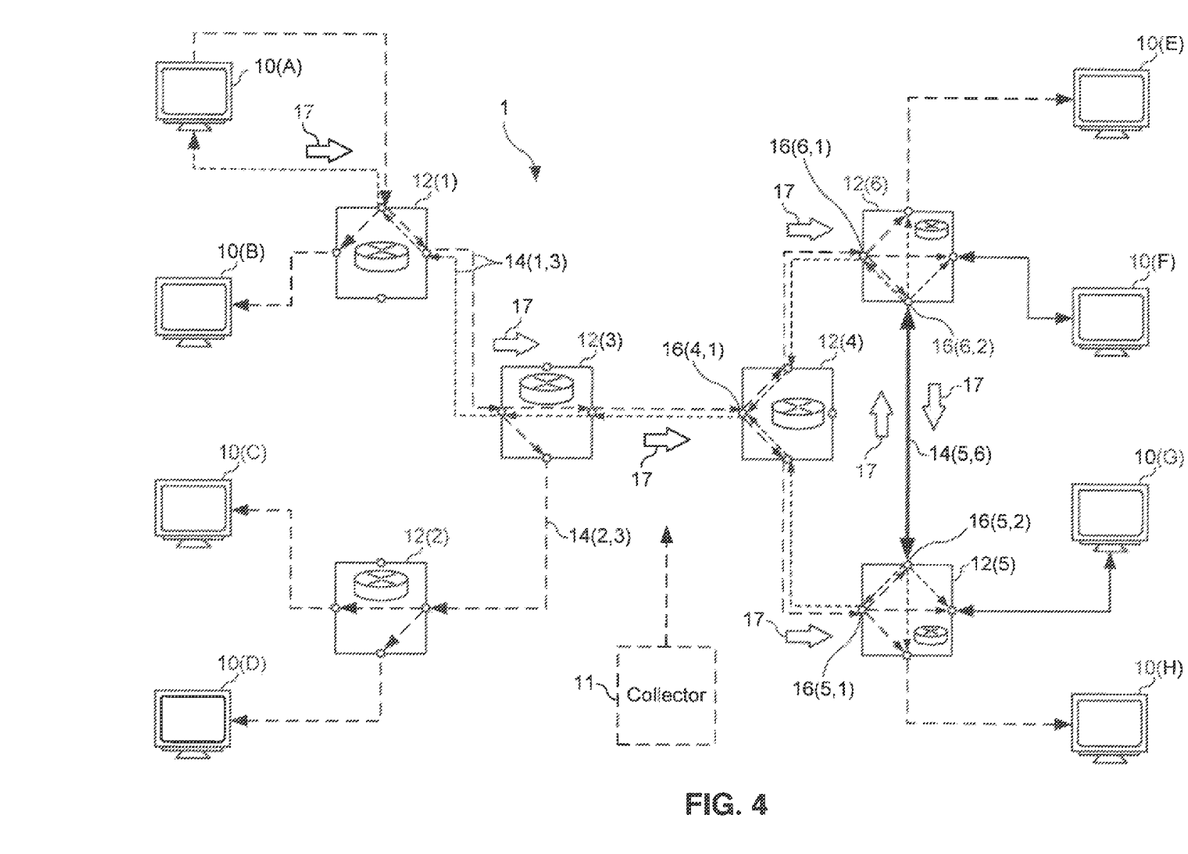
FIG. 4 illustrates a network configured to remove unwanted loops according to one embodiment.

FIG. 4 illustrates a network configured to remove unwanted loops according to one embodiment. The newly introduced loop, as described in FIG. 3, causes the broadcast traffic from host 10(A) to be looped back into the network 1. In this example, shorter dashed lines represent the loop back flow that contradicts the steady state flow. This loop backflow originates at two places:

At switch 12(5) port 16(5,2).
At switch 12(6) port 16(6,2).

Although FIG. 4 illustrates one flow, it is appreciated that in other embodiments a loop may be detected by observing one network flow or several network flows. In some embodiments, one or more hosts can send data over the network during a preselected sampling period.

In some embodiments, switches 12(5) and 12(6) treat the looped-back traffic as broadcast traffic entering the switch 12(5), 12(6), and hence sending the looped-back traffic all over network 1. In some instances, in addition to the broadcast traffic being sent back into the network 1, the broadcast traffic may also loop in the path coupling switches 12(4), 12(5), and 12(6) causing a packet storm.

During a packet storm, packets are sampled on segments, such as segment 14(5,6), and the information regarding the contradictory direction of flow on the sampled packets collected on the segments is collected on the segments. In one embodiment, the processing entity, such as collector, 11, compares the direction of flow with the saved steady state and generates a set of loop pointers 17 if the direction of the flow contradicts the steady state. In alternative embodiments, a host, such as host 10(A) or nodes, such as 16(4,1), 16(5,1), 16(5,2), 16(6,1) and 16(6,2), may compare the direction of the flow with a saved steady state and generate the set of loop pointers 17.

After a certain period of time (based upon system parameters such as sampling rate), the loop pointers 17 will trace one or more paths starting from host 10(A) that leads to the loop back. In this exemplary embodiment, the loop pointers 17 trace two paths that result in the loop back:

PATH 1: Switch 12(1)→Switch 12(3)→Switch 12(4) (port 16(4,1))→Switch 12(6) (port 16(6,1))→Switch 12(5) (port 16(5,2))

PATH 2: Switch 12(1)→Switch 12(3)→Switch 12(4) (port 16 (4,1))→Switch 12(5) (port 16 (5,1))→Switch 12(6) (port 16 (6,2))

In this example, a flow's loop pointers 17 split when they enter the loop and meet again to complete the loop. For instance, the loop pointers 17 in PATH 1 and PATH 2 split at switch 12(4) (port 16(4,1)) and join back to complete the loop at switch 12(5) (port 16(5,2)) and switch 12(6) (port 16(6,2)). Using this information, the processing entity detects the loop.

The processing entity according to some embodiments discussed herein can autonomously detect a new segment that causes a loop back to occur. In the present example, the link 14(5,6) coupling ports 16(5,2) and 16(6,2) may be automatically identified as the cause of the loop back. The attributes that can aid in identifying a bad segment, such as segment 14(5,6), may include:

sampling data packets on a segment and determining that the segment is transmitting data packets that flow in a direction that contradicts with the steady state direction determining that a segment is not associated with steady state information Two loop pointers for the new segment are created that point in opposite directions when these two conditions are met for a new segment that creates a loop. These attributes allow the locational cause of the loop to be uniquely identified.

During a packet storm, the high likelihood of a packet loss increases. Hence reliable transmission of sampled packets to the collector 11 is needed. This can be accomplished by two methods:

1. Use of an out-of-band management VLAN (virtual local area network) to send the sampled data to the collector 11. Since this VLAN is not part of the packet storm, the sampled packets remain unaffected. The VLAN monitors the network 1 in the form of a software overlay.
2. Prioritization of the sampled packets based upon information contained in the packet headers increases the likelihood of the sampled packets surviving the storm and reaching the collector 11.

It is appreciated that while the loss of a few sampled packets may not affect the ability of the algorithm to detect a loop, it may cause a delay in the detection process.

In one embodiment, loop detection may be performed by each individual networking node associated with a router or switch or by a router or a switch, such as switches 12(5) and 12(6), distributed throughout the network. The elements in this embodiment are contained within network 1, and there is therefore no single point of failure. According to this embodiment, an external collector 11 or other entity may not be needed, while it provides for a self-healing network.

In one embodiment, a process, such as a software module, on or associated with each networking node distributed throughout a network, collects the samples, and extracts the flow and direction information. The process detects whether a loop back has formed, and creates a loop pointer if a loop back is detected, as described in FIG. 4. The loop pointers that are created may be communicated to peer processes running on connected peer nodes. In one embodiment, a message containing the loop pointers information may be transmitted to the peer node when a contradictory flow is detected. In one embodiment, the loop pointer message may contain information regarding the traffic flow that caused the creation of the loop pointer. This message may be transmitted on the link where the loop pointer was observed. These messages are sent in the direction of the loop pointers.

In some embodiments, every loop pointer may result in a message being sent to a peer node. Eventually the message may reach a node that also has a loop pointer in the opposite direction for a particular segment. In FIG. 4, for example, this event happens on port 16(6,2) and port 16(5,2). The existence of loop pointer messages in both directions for a segment 14(5,6) indicates a complete loop. In this way, the embodiments described herein provide a mechanism to detect a loop.

In some embodiments described herein, a processing entity, such as hosts described herein, collector 11, and nodes described herein can remove a network loop in two different ways:

Link down (break) the newly created link, such as segment 14(5,6), that caused the loop.

Link down on the lowest bandwidth link segment of the loop. This stops the loop, but advantageously keeps the high bandwidth part of the network active. For this purpose, "lowest bandwidth" refers to the bandwidth of a segment without regard to the amount of traffic that is actually carried by the segment.

Figure 5:
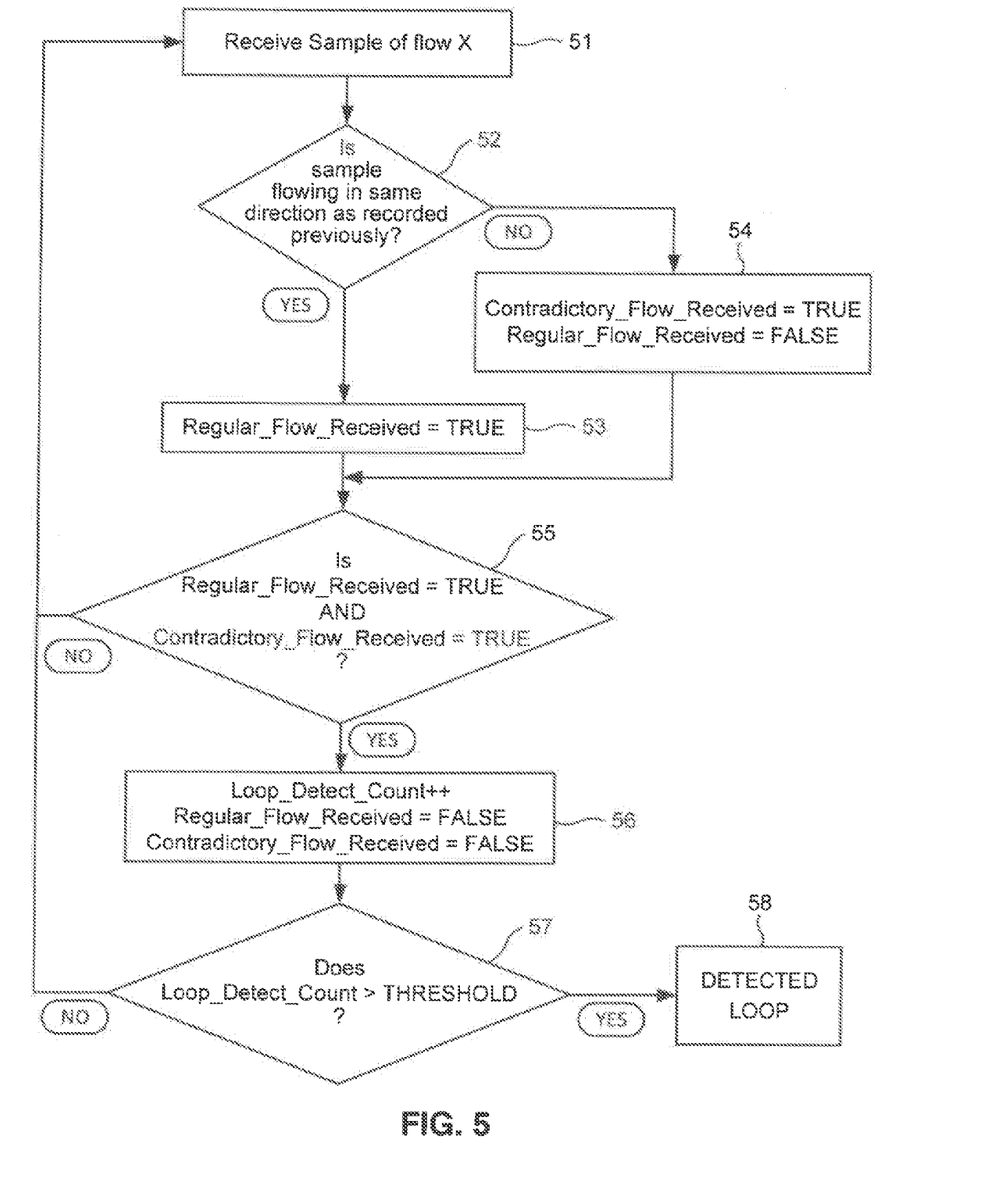
FIG. 5 shows an exemplary flow diagram for identifying and removing unwanted loops in accordance with one embodiment.

FIG. 5 shows an exemplary flow diagram for identifying and removing unwanted loops in accordance with one embodiment. In some embodiments, a processing entity may perform the method of FIG. 5. A processing entity, as discussed with respect to FIGS. 1-4, may be a host, a collector or a node in a network. In some embodiments, the method illustrated in FIG. 5, as well as all the other methods illustrated and described in this specification, may be performed by one or more modules associated with a processing entity. In some instances, the modules may be implemented in hardware, software, firmware, or any combination thereof. When the modules are implemented in software, said modules can reside on one or more computer-readable media as a series of computer program instructions.

The computer-readable media can be any means for storing computer program instructions, including hard disks, floppy disks, optical disks, CD's, DVD's, and/or thumb drives.

A host connection could be changed to a different switch when a network is reconfigured by a system administrator. For instance, a host may transmit traffic in a different flow direction, which could be in the opposite flow direction of the originally sent traffic. In this embodiment, flow diagram of FIG. 5 may prevent a false positive declaration of network loop by distinguishing among reconfigurations and network loops.

A processing entity may differentiate between a network reconfiguration and a network loop using the following rules. A network reconfiguration is diagnosed when:

1. A rate of sampled data packets that flow in the same direction as a steady state direction decreases over a preselected period of time, and
2. A rate of sampled data packets that flow in the opposite direction of the steady state direction increases over the preselected period of time.

A network loop is diagnosed when the following contradiction continues:

1. New data packet samples of a flow in the steady state direction continue to be recorded at the end of a preselected period of time, and
2. New data packet samples of a flow in the opposite direction to the steady state direction also continue to be recorded at the same point in time as in criterion (1); and
3. Criteria (1) and (2) samples persist as long as the loop exists in the network.

When the above three conditions are met, a network loop is identified. Accordingly, a processing entity may differentiate a network loop from a network reconfiguration.

FIG. 5 illustrates method of distinguishing a network loop and a network reconfiguration. At step 51, a processing entity receives a sample of a particular flow. For example, a data sample for flow X is received.

At step 52, the processing entity determines whether the sampled data for flow X flows in the same direction as the flow direction of the steady state direction that is previously recorded. If the direction of the sampled data for flow X and the steady state direction flow in the same direction, the method proceeds to step 53. At step 53, the processing entity sets a parameter called Regular_Flow_Received to TRUE. If the sampled data for flow X and the steady state flow in contradictory directions, then the method proceeds to step 54, and the processing entity sets a parameter called Contradictory_Flow_Received to TRUE and the parameter Regular_Flow_Received to FALSE.

At step 55, the processing entity determines whether the parameter Regular_Flow_Received is TRUE and whether the parameter Contradictory_Flow_Received is also TRUE. Presence of a loop is detected if both Regular_Flow_Received and Contradictory_Flow_Received are true. Then, the method proceeds to step 56. Otherwise, the method loops back to step 51.

At step 56, the counter Loop_Detect_Count is incremented, Regular_Flow_Received is set to FALSE, and Contradictory_Flow_Received is set to FALSE. Then, the method proceeds to step 57. At step 57, the processing entity determines whether the counter Loop_Detect_Count exceeds a preselected threshold. This threshold may be set empirically, and may be set sufficiently high to minimize false positive determinations of network loops. Presence of a loop is detected if the Loop_Detect_Count exceeds the preselected threshold. Then, the method proceeds to step 58, where it is verified whether there was a network loop. As such, appropriate self-healing steps can be taken to eliminate the loop. Otherwise, the method circles back to step 51.

The above description is included to illustrate the operations of one or more embodiments of the general concept, and is not meant to limit the scope of the claimed invention. From the above discussion, many variations will be apparent to one skilled in the art that would yet be encompassed by the spirit and scope of the present concept.

The invention claimed is:

1. A method comprising:
receiving information regarding a direction of data flow in a network;
receiving information regarding a direction of data flow in steady state from a memory component, wherein the network is loop free in the steady state;
determining whether the direction of the data flow in the network contradicts the direction of data flow in steady state;
identifying a presence of a closed loop in the network in response to a contradiction between the direction of data flow in the network and the direction of data flow in the steady state;
sampling data flow in the network over a period of time, wherein the sampling identifies a direction of a further data flow;
determining whether a rate of the further data flow in a same direction as in the steady state is decreasing over the period of time;
determining whether a rate of the further data flow in opposite direction as in the steady state is increasing over the period of time; and
determining that the network is closed loop free in response to determining that the rate of the further data flow in the same direction is decreasing and that the rate of the further data flow in the opposite direction is increasing.

2. The method of claim 1 further comprising:
generating a plurality of loop pointers in response to the contradiction between the direction of data flow in the network and the direction of data flow in the steady state, wherein a loop pointer of the plurality of loop pointers indicates a direction of data flow in the steady state; and
identifying a segment of the network as part of the closed loop based on the plurality of loop pointers, wherein the segment couples a first network node to a second network node and provides a data path therebetween.

3. The method of claim 2 further comprising:
disabling the segment in response to identifying the segment as part of the closed loop.

4. The method of claim 1 further comprising:
prior to identifying the presence of the closed loop, determining whether there is an absence of steady state information associated with a segment in the network, wherein the segment couples a first network node to a second network node and provides a data path therebetween, and wherein two loop pointers are created in opposite directions and in response to the absence of the steady state information; and
determining whether the segment is part of the closed loop using the two loop pointers.

5. The method of claim 1 further comprising:
determining whether a segment in the network is part of the closed loop, wherein the segment couples network nodes in the network and provides a path for data to flow to and from the network nodes;
determining a bandwidth associated with the segment; and
disabling the segment from the network in response to determining that the segment has a low bandwidth and further in response to determining that the segment is part of the closed loop.

6. The method of claim 1, wherein the network comprises a combination of network switches, routers, host computers, and segments coupling the network switches, routers and host computers.

7. An apparatus comprising:
a network interface configured to communicate with a device in a network; and
a module configured to:
sample data flow in the network over a period of time, wherein the sampling identifies a direction of data flow;
determine whether a rate of data flow in a same direction as in a steady state is decreasing over the period of time;
determine whether a rate of data flow in opposite direction as in the steady state is increasing over the period of time; and
determine that the network is closed loop free in response to determining that the rate of data flow in the same direction is decreasing and that the rate of data flow in the opposite direction is increasing, and further determine that the network includes a closed loop in response to determining that the rate of data flow in the same direction is increasing and that the rate of data flow in the opposite direction is decreasing; and
remove the closed loop from the network in response to the determination that the network includes the closed loop.

8. The apparatus of claim 7, wherein the determination of whether the network includes a closed loop comprises:
receiving information regarding a direction of data flow in the network;
receiving information regarding a direction of data flow in steady state, wherein the network is loop free in the steady state;
determining whether the direction of the data flow in the network contradicts the direction of data flow in steady state; and
identifying a presence of the closed loop in the network flow in response to a contradiction between the direction of data flow in the network and the direction of data flow in the steady state.

9. The apparatus of claim 8, wherein the module is further configured to:
generate a plurality of loop pointers in response to the determination of the contradiction between the direction of data flow in the network and the direction of data flow in the steady state, wherein a loop pointer of the plurality of loop pointers indicates a direction of data flow in the steady state; and
identify a segment of the network comprising the closed loop based on the plurality of loop pointers, wherein the segment couples a first network node to a second network node and provides a data path therebetween, and wherein the removal of the closed loop comprises deactivating the segment.

10. The apparatus of claim 7, wherein the module is further configured to:
determine whether there is an absence of steady state information associated with a segment in the network, wherein the segment couples a first network node to a second network node and provides a first data path therebetween, wherein two loop pointers are created in opposite directions and in response to the absence of steady state information; and
determine whether the segment is part of the closed loop using the two loop pointers, and wherein removal of the closed loop comprises initiating a link down process of the segment in response to determining that the segment is part of the closed loop.

11. The apparatus of claim 7, wherein the module is further configured to:
determine whether a segment in the network is part of the closed loop, wherein the segment couples a first network node to a second network node and provides a data path therebetween; and
determine a bandwidth associated with the segment, and wherein removal of the closed loop comprises deactivating the segment from the network in response to the determination that the segment has a low bandwidth and further in response to the determination that the segment is part of the closed loop.

12. The apparatus of claim 7, wherein the apparatus is a networking device.

13. A non-transitory computer readable medium having stored thereon, computer executable instructions that, if executed by a device causes the device to perform a method comprising:
sampling data flow in a network over a period of time, wherein the sampling identifies a direction of data flow;
determining whether a rate of data flow in a same direction as in a steady state is decreasing over the period of time;
determining whether a rate of data flow in opposite direction as in the steady state is increasing over the period of time;
determining that the network is closed loop free in response to determining that the rate of data flow in the same direction is decreasing and that the rate of data flow in the opposite direction is increasing;
determining that the network includes a closed loop in response to determining that the rate of data flow in the same direction is increasing and that the rate of data flow in the opposite direction is decreasing; and
identifying a segment that is part of the closed loop in response to determining that the network includes a closed loop, wherein the segment couples a first network node to a second network node and provides a data path therebetween.

14. The method of claim 13, further comprising:
disabling the segment from the network in response to identifying the segment as part of the closed loop.

15. The method of claim 13, further comprising:
determining a bandwidth associated with the segment; and
disabling the segment from the network in response to determining that the segment has a low bandwidth and further in response to identifying the segment as part of the closed loop.

16. The method of claim 13, wherein determining whether the network includes a closed loop comprising:
receiving information regarding a direction of data flow in the network;
receiving information regarding a direction of data flow in steady state, wherein the network is loop free in the steady state;
determining whether the direction of the data flow in the network contradicts the direction of data flow in steady state; and
identifying a presence of the closed loop in the network flow in response to a contradiction between the direction of data flow in the network and the direction of data flow in the steady state.

17. The method of claim 13 further comprising:
determining whether a direction of the data flow in the network contradicts a direction of data flow in steady state, wherein the network is loop free in the steady state; and
generating a plurality of loop pointers in response to the determination of the contradiction between the direction of data flow in the network and the direction of data flow in steady state, wherein a loop pointer of the plurality of loop pointers indicates a direction of data flow in steady state, and wherein identifying the segment as part of the closed loop is based on the plurality of loop pointers.

18. The method of claim 13, further comprising:
determining whether there is an absence of steady state information associated with the segment, and wherein two loop pointers are created in opposite directions and in response to the absence of the steady state information, and wherein identifying the segment is based on the two loop pointers.

* * * * *